United States Patent [19] [11] 4,452,942
Shida et al. [45] Jun. 5, 1984

[54] ADHESIVE BLENDS CONTAINING ANACID OR ANHYDRIDE GRAFTED LLDPE

[75] Inventors: Mitsuzo Shida, Barrington; Robert Zeitlin, Palatine; John Machonis, Jr., Schaumburg; Ashok M. Adur, Rolling Meadows, all of Ill.

[73] Assignee: Chemplex Company, Rolling Meadows, Ill.

[21] Appl. No.: 350,265

[22] Filed: Feb. 19, 1982

[51] Int. Cl.³ .................... C08L 23/26; C08L 23/04; C08L 51/06
[52] U.S. Cl. ...................................... 525/74; 525/78; 525/193
[58] Field of Search ............................ 525/74, 78, 193

[56] References Cited

U.S. PATENT DOCUMENTS 3,658,948  4/1972  McConnell ..................... 525/74
3,856,889  12/1974  McConnell ..................... 525/74
3,882,194  5/1975  Krebaum et al. ............... 525/193
3,886,227  5/1975  Van Brederode et al. ........ 525/74
4,087,587  5/1978  Shida et al. .................... 525/74
4,087,588  5/1978  Shida et al. .................... 525/74
4,230,830  10/1980  Tanny et al. ................... 525/193

OTHER PUBLICATIONS

"Plastics World" Dec. 1979, p. 86, New Materials.
"Package Engineering" Sep. 1980, pp. 48–49, New Polyethylenes.

Primary Examiner—Carman J. Seccuro
Attorney, Agent, or Firm—Wood, Dalton, Phillips, Mason & Rowe

[57] ABSTRACT

Compositions of matter having properties that make them strong adhesives to various substrates and especially to various polar substrates. These compositions comprise blends of graft copolymer of a linear low density polyethylene backbone grafted with at least one grafting monomer comprising one or more of polymerizable ethylenically unsaturated carboxylic acids or the anhydrides of such acids, blended with a blending polyolefin resin. The disclosure also includes composite structures comprising one or more substrates and a blend of the above as the adhesive in contact with the substrate or substrates. The disclosure also includes the process or method that uses these blends for combining one or moe substrates.

5 Claims, No Drawings

ADHESIVE BLENDS CONTAINING ANACID OR ANHYDRIDE GRAFTED LLDPE

BACKGROUND OF THE INVENTION

Composite structures comprising an adhesive blend and one or more substances, especially polar substrates, are finding great utility in industry. Examples of polar substrates are nylon, ethylene-vinyl alcohol copolymers (EVOH), polyvinyl alcohol polymers (PVOH), metals, glass and wood.

Adhesive blends of polyolefins (either homopolymer or copolymer) with graft copolymers of unsaturated carboxylic acids and their derivatives such as anhydrides, esters, amides, imides, metal salts, and the like, and the resulting composite structures, are finding increasing uses. The improvement of this invention includes preparing the graft copolymer with a linear low density polyethylene (LLDPE) backbone instead of a high density polyethylene or low density polyethylene backbone.

This invention permits reducing the temperature for the onset of adhesion of polyolefin adhesive blends compared to that for blends containing high-density polyethylene graft copolymer, by substituting in its place a linear low density polyethylene graft copolymer.

This invention also provides new adhesive blends with improved adhesion over blends containing conventional branched low density polyethylene graft copolymers. These adhesive blends show good adhesion to olefin polymers as well as to other substrates such as nylons, polyamides, polyvinyl alcohol and its copolymers including ethylene-vinyl alcohol copolymers, polyurethanes, polyesters, aluminum, steel, copper and other metals, paper, wood, leather, polycarbonates and the like.

The invention also includes composite structures including the adhesive blends of this invention. The composite structure can be in the form of films, containers, sheets, bottles, tubes, etc.

This invention includes any process or method that uses these blends for combining dissimilar materials. Examples of such processes are lamination, coextrusion, blow molding, extrusion coating, powder coating, etc., or any combination thereof.

SUMMARY OF THE INVENTION

By grafting suitable unsaturated carboxylic acids or acid anhydrides to a linear low density polyethylene backbone (LLDPEg) and blending the resulting graft copolymer with ethylene homopolymers or copolymers of ethylene with α-olefins or copolymers of ethylene with ethylenically unsaturated esters or their derivatives or blends thereof, we have obtained compositions with excellent adhesive strength to various substrates including olefin polymers, polar polymers such as nylon, ethylene-vinyl alcohol copolymers, polyvinyl alcohol polymers, and other polar substrates such as methals, glass, cellophane, paper, wood and many others.

This invention is an improvement over adhesive blends comprising graft copolymers of carboxylic acid anhydrides on a high density polyethylene backbone, blended with either homopolymers or copolymers of ethylene with α-olefins and/or ethylenically unsaturated esters. These blends show good adhesion to polar substrates including metals. The onset temperature of adhesion for such blends is too high for some lamination processes. By lowering the melting point of the graft copolymer component of these blends, the onset temperature for good adhesion is lowered significantly. This could be accomplished by changing the backbone of the graft copolymer from high density polyethylene to low density polyethylene. However, blends containing low density polyethylene graft copolymer have poorer adhesion than those blends containing high density polyethylene graft copolymer. By using blends containing graft copolymers with a linear low density polyethylene backbone, low onset temperature of adhesion is obtained. Surprisingly, excellent adhesion to polyolefins and several other substrates was obtained.

The use of linear low density backbone graft copolymers (LLDPEg) results in better dispersion of the graft copolymer in many of the blending resins. As a result of the improved dispersion, the clarity of the graft copolymer blends is improved.

The linear low density polyethylenes used as the backbone in the graft copolymers of this invention have a unique set of properties which distinguish them from both conventional low density polyethylene (LDPE) resins and high density polyethylene resins. Because of the methods by which low density polyethylenes are prepared, they are highly branched materials which have a tendency to coil on themselves. The linear low density materials, on the other hand, as their name indicates, have very little of this long-chain branching and have on the backbone just short-chain branches introduced by the use of a comonomer.

This linear structure allows the polymer to stretch out better and also to blend more easily with other polymers. The range of density for linear low density polyethylenes is from about 0.91 to 0.939 g/cc. This distinguishes LLDPE from HDPE which range from 0.94 to 0.97 g/cc. The structure of the linear low density polyethylenes differs from the high density materials by the fact that they contain considerably more of the comonomer than the high density polyethylene copolymers leading to a high degree of short-chain branching. This difference in structure causes their properties to differ from those of HDPE and LDPE.

Linearity leads to good tensile and tear properties while branching yields toughness, puncture resistance and tear strength, low temperature impact, low warpage and excellent environmental stress crack resistance. These differences from conventional low density polyethylene and high density polyethylene have caused LLDPE to be called a third generation of polyethylene—a different material, actually a hybrid with its own set of properties. Because it has its own set of properties, one cannot per se extrapolate and predict the properties of this material, when combined with other polymers, on the basis of the behavior of HDPE or LDPE in blends. Hence, it was surprising to note that these materials, when used as the backbone in the graft compolymers, are able to yield properties which are not possible with backbones of LDPE or HDPE.

By grafting suitable unsaturated carboxylic acids or their derivatives, preferably anhydride, to linear low density polyethylene (density of 0.910–0.939 g/cc) resin and blending the resultant graft copolymers with polyolefin resins comprising homopolymers of ethylene, α-olefin copolymers of ethylene, copolymers of ethylene and ethylenically unsaturated esters of their derivatives, and blends thereof, we have obtained blends with excellent adhesive strength to various substrates including polar polymers like nylon and other polyamides, ethylene-vinyl alcohol copolymers, polyvinyl alochol and its copolymers, polyurethanes, and other carbonyl containing polymers, metals, glass, wood, paper, and the like at lower onset temperatures.

The invention also includes composite structures of the adhesive blends of this invention. The composite structures can be in the form of film, bottles, sheet, containers, tubes, and the like. They can be made by any method known to one skilled in the art. Examples of such methods are coextrusion, molding, laminating, coating, blow molding or a combination of these methods, or any other method for joining dissimilar materials known to those skilled in the art.

The unsaturated carboxylic acids or acid anhydrides used as the grafting monomers include compounds such as acrylic acid, maleic acid, methacrylic acid, fumaric acid, itaconic acid, citraconic acid, mesaconic acid, maleic anhydride, 4-methyl cyclohex-4-ene-1,2-dicarboxylic acid anhydride, bicyclo (2.2.2)oct-5-ene-2,3-dicarboxylic acid anhydride, 1,2,3,4,5,8,9,10-octahydronaphthalene-2,3-dicarboxylic acid anhydride, 2-oxa-1,3-diketospiro(4.4)non-7-ene, bicyclo(2.2.1)hept-5-ene-2,3-dicarboxylic acid anhydride, maleopimaric acid, tetrahydrophthalic anhydride, x-methylbicyclo(2.2.1-)hept-5-ene-2,3-dicarboxylic acid anhydride, x-methylnorborn-5-ene-2,3-dicarboxylic acid anhydride, norborn-5-ene-2,3-dicarboxylic acid anhydride, Nadic anhydride, methyl Nadic anhydride, Himic anhydride, methyl Himic anhydride and other fused ring monomers described in U.S. Pat. Nos. 3,873,643 and 3,882,194, both assigned to the assignee hereof.

Cografting monomers as described in U.S. Pat. No. 3,882,194 are also useful for preparing the graft copolymers of this invention.

Include among the conjugated unsaturated esters suitable for cografting are dialkyl maleates, dialkyl fumarates, dialkyl itaconates, dialkyl mesaconates, dialkyl citraconates, alkyl acrylates, alkyl crotonates, alkyl tigliates and alkyl methacrylates, where alkyl represents aliphatic, aryl-aliphatic and cycloaliphatic groups containing 1-12 carbon atoms. Esters particularly useful in the cografted copolymers of this invention are dibutyl maleate, diethyl fumarate and dimethyl itaconate. Among the acids and acid anhydrides particularly useful in the cografted copolymers of this invention are maleic anhydride, fumaric acid, tetrahydrophthalic anhydride, x-methylbicyclo(2.2.1)hept-5-ene-2,3-dicarboxylic acid anhydride and bicyclo(2.2.1)hept-5-ene-2,3-dicarboxylic acid anhydride.

It is often desirable to use more than one monomer in either or both classes of monomers in order to control the physical properties of the final products. The method in general consists of heating a mixture of the polymer or polymers and the monomer to monomers with or without a solvent. The mixture can be heated to above the melting point of the polyolefin with or without a catalyst. Thus, the grafting occurs in the presence of air, hydroperoxides, other free radical catalysts or in the essential absence of those materials where the mixture is maintained at elevated temperatures and (if no solvent is used) preferably under high shear.

The graft and cograft copolymers of this invention are recovered by any method or system which separates or utilizes the graft copolymer that is produced. Thus, the term includes recovery of the copolymer in the form of precipitated fluff, pellets, powders and the like, as well as further chemically reacted or blended pellets, powders and the like or in the form of shaped articles formed directly from the resulting copolymer.

A convenient method of accomplishing the reaction is to premix the ingredients and then extrude the composition through a heated extruder. Other mixing means, such as a Brabender mixer, a Banbury mixer, roll mills, and the like, may also be employed. In order to prevent undue increase in molecular weight with a possibility of some crosslinking at elevated temperatures, it is desirable to carry out the reaction in a closed reaction vessel. A conventional single or multiple screw extruder accomplishes this result without the use of auxiliary equipment, and for this reason is a particularly desirable reaction vessel, although it is by no means necessary.

The resulting copolymers of this invention are found to consist of about 70-99.95 wt. % of LLDPE and about 0.05-30 wt. % of the unsaturated acid or acid anhydride or mixtures.

The cograft copolymers of this invention consist of about 50-99.90 wt. % of LLDPE, about 0.05-25 wt. % of the unsaturated acid or acid anhydride or mixtures thereof and about 0.05-25 wt. % of the unsaturated ester and mixtures thereof. These resulting graft copolymers are capable of being blended or reacted with a wide variety of other materials to modify the copolymer further.

Adhesive blends of this invention can be used in composites containing polar substrates such as nylon, ethylene vinyl alcohol copolymers (EVOH), polyvinyl alcohol (PVA), polyester, polyurethane, metals, etc. These compositions can be just two layers or they can be three or more layers with materials which adhere to either layer being added to the structure. For instance, polyolefins like polyethylene (PE), ethylene vinyl acetate copolymers (EVA) or ethylene copolymers with other monomers, ionomers and polypropylene (PP) can be used in these layers. It is obvious that many combinations can be made by one skilled in the art of using the principles disclosed.

The method for this joining can be lamination, coextrusion, extrusion lamination, extrusion or coextrusion coating or any other method for joining dissimilar materials to form composite structures known to those skilled in the art.

Some examples of these composites are PE/adhesive of this invention/nylon, PE/adhesive/ethylene-vinyl alcohol copolymer, PE/adhesive/aluminum, PE/adhesive/steel, PE/adhesive/glass, PE/adhesive/wood, PE/adhesive/leather, PE/adhesive/nylon/adhesive/PE, and PE/adhesive/EVOH/adhesive/PE. Some examples of composites involving other polyolefins are EVA/adhesive/nylon, ionomer/adhesive/nylon, PP/adhesive/nylon. Obviously, many other combinations of polyolefins and polar substrates can be prepared by one skilled in the art using the principles described above.

Examples of other metal combinations are aluminum/adhesive/aluminum or adhesive/aluminum/adhesive or polyethylene/adhesive/aluminum/adhesive/polyethylene. Other metals such as copper, steel, brass, etc. can also be used. Dissimilar metal examples are: aluminum/adhesive/copper, aluminum/adhesive/steel, aluminum/adhesive/brass, etc. One could also have combinations in which one has a metal/adhesive/polar polymer. Examples of these could be aluminum/adhesive/nylon or aluminum/adhesive/EVOH, or steel/adhesive/nylon/adhesive/steel. Here again, one skilled in the art can find a number of obvious combinations from the principles described above.

These materials can be used to manufacture many different useful articles. They can be used as packaging film, blow molded bottles, coextruded sheet which can be thermoformed into containers, coatings on glass bottles or wood or metal or even to join two metals, either the same metal or dissimilar metals, into a lamination.

In preparing the blends in the following examples, any blending equipment or technique may be used.

All blends preferably contain an antioxidant package.

In specific examples, blends were prepared in an electrically heated Brabender plasticorder mixer using a scroll type mixer under the following conditions: 325° F., rotor speed of 120 rpm, and total mixing time is 10 minutes.

The resultant blends were then compression molded into films approximately 0.006 inches thick at 350° F. The films were then pressed to the substrate in a Sentinel heat sealer (Model 12 or 12AS) at 40 psi pressure. The temperature and time of sealing are varied according to the conditions desired. The sample is 1 inch in width, the sealing area is 1 square inch. The separation rate is 5 inches per minute. The maximum peeling load after the initial peak in lbs. per inch of specimen length is reported. The average of 5 specimens is taken as the T-peel strength of the adhesive bond. The test angle is 180°.

The procedure herein described is realted to ASTM D 1876 (re-appearance 1978) with the following differences:
1. The test panel is ASTM D1876—72—12 inches long by 6 inches wide. The first 3 inches of length are bent back to form a 90° bend.
2. The peel strength is determined from the atuographic curve for the first 5 inches of peeling after the initial peak.
3. The average peeling load in lbs/in of the specimen width required to separate the adherent is reported.

EXAMPLE 1

X-methyl bicyclo(2.2.1)hept-5-ene-2,3-dicarboxylic acid anhydride (XMNA) is reacted with a linear low density polyethylene whose high load melt index was 9.0 g/10 min and whose density was 0.939 g/cc to give a graft copolymer (LLDPEg) with 1.5 wt. % XMNA and a melt index of 5.1 g/10 min. The above graft copolymer was blended at a 10:90 weight ratio with an ethylene-vinyl acetate copolymer containing 12% vinyl acetate and whose melt index is 12 g/10 min. The blend was tested for adhesion using the procedure described above.

XMNA was reacted with a high density polyethylene homopolymer resin whose melt index under high load was 7.0 g/10 min. and whose density was 0.961 g/cc to give a graft copolymer (HDPEg) with 1.5% XMNA amd a melt index of 1.5 g/10 min. A 10:90 blend of this graft copolymer with the same ethylene-vinyl acetate copolymer described above was tested in the same manner.

In both cases, the samples were sealed to aluminum as a function of temperature for 5 seconds in the Sentinel heat sealer. The following results were obtained in lbs/in.

| Graft Copolymer | Adhesion to Aluminum | | |
| Type in Blend | 270° F. | 280° F. | 290° F. |
| --- | --- | --- | --- |
| LLDPEg | 1.7 | >5.4$^E$ | >7.0$^E$ |
| HDPEg | 0.8 | 3.2 | >6.2$^E$ |

$^E$indicates elongation of film.

This example shows the lowering of the temperature for the onset of adhesion of a result of the use of linear low density graft copolymer (LLDPEg).

EXAMPLE 2

XMNA was reacted with another linear low density polyethylene whose melt index was 0.6 g/10 min. and whose density was 0.919 g/cc. The graft copolymer (LLDPEg) has a melt index of 6.0 g/10 min. and XMNA content of 1.1 wt. %. This graft copolymer was blended at the same level into the same ethylenevinyl acetate copolymer used in Example 1. The blend was tested to aluminum as a function of temperature for 5 seconds in the Sentinel heat sealer. This was compared to the results of the HDPEg blend used in Example 1. The results are given in lbs/in. below:

| Graft Copolymer | Adhesion to Aluminum | | | | |
| Type in Blend | 250° F. | 260° F. | 270° F. | 280° F. | 290° F. |
| --- | --- | --- | --- | --- | --- |
| LLDPEg | 1.3 | >3.2$^{SE}$ | >5.9$^E$ | CNS | CNS |
| HDPEg | <0.1 | <0.1 | 0.8 | 3.2 | >6.2$^E$ |

$^E$indicates elongation of film and
$^{SE}$indicates slight elongation of the film.
CNS indicates Could Not Separate.

This example shows that the LLDPEg copolymer lowers the temperature for the onset of adhesion, compared to the HDPEg blend.

EXAMPLE 3

A graft copolymer was prepared by reacting a linear low density polyethylene whose density is 0.916 g/cc and whose high load melt index (21,260 gm) is 2.8 g/10 min. with XMNA. The resulting graft copolymer has a melt index of 6.2 g/10 min. and an XMNA content of 1.6 wt. %. This graft copolymer was blended with the same ethylene-vinyl acetate copolymer used in Example 1 and adhered to tin-free steel for 3 seconds at the temperature shown in the table below. The adhesion is reported in lbs/in.

The graft copolymer prepared from high-density polyethylene homopolymer described in Example 1 and blended with the same ethylene-vinyl acetate copolymer (EVA) used in Example 1 was also adhered to tin-free steel at the temperatures shown in the table below with the following results in lbs/in.

| Graft Copolymer | Adhesion to Tin-Free Steel | |
| Type in Blend | 400° F. | 290° F. |
| --- | --- | --- |
| HDPEg | CNS | <.1 |
| LLDPEg | CNS | 3.1 |

CNS indicates Could Not Separate.

EXAMPLE 4

XMNA is reacted with low density polyethylene (LDPE) homopolymer whose melt index is 1.0 grams/10 min. and whose density is 0.921 g/cc to give a graft copolymer (LDPEg) whose melt index is 3.5 g/10 min. and whose XMNA content is 0.83 wt. %. This graft copolymer (LDPEg) is blended at several concentrations into the same ethylene-vinyl acetate copolymer used in Example 1.

For comparison purposes, the linear low density graft copolymer (LLDPEg) described in Example 2 is blended into the same EVA that was used in Example 1. The results are shown in the following table.

| Graft Copolymer Type | % Graft Copolymer in Blend | Adhesion to Aluminum, lbs/in | |
|---|---|---|---|
| | | 290° F. 5 sec | 270° F. 5 sec |
| LLDPEg (density 0.919) 1.07% XMNA | 10 | >6.3$^E$ | >5.5$^E$ |
| LDPEg (density 0.921) 0.83% XMNA | 10 | 0.6 | — |
| | 15 | 1.2 | 1.0 |
| | 20 | 1.2 | 0.8 |

$^E$indicates elongation of film.

This example shows the improvement in adhesion obtained as a result of the use of a linear low density polyethylene graft copolymer (LLDPEg) compared to the use of a low density polyethylene graft copolymer (LDPEg). This illustrates the importance of the linearity of the low density polyethylene as the grafted component. Increasing the amount of LDPEg copolymer in the blend to 15 and 20% levels to attain or even exceed the amount of XMNA in the LLDPEg blend used does not increase the adhesion of the blend to the levels attained by the blend containing 10% LLDPEg copolymer.

EXAMPLE 5

The low density polyethylene grafted with XMNA used in Example 4 (LDPEg) and the linear density polyethylene graft copolymer (LLDPEg) used in Example 3 were separately blended at a 10% weight ratio into low density polyethylene of melt index 1.8 g/10 min. and a density of 0.922 g/cc. These blends were heat-sealed to nylon 6 film at set conditions of 430° F. and 1 sec. The results are given below in lbs/in.

| Graft Copolymer Type in Blend | Adhesion to Nylon 6 |
|---|---|
| LLDPEg | >5.4$^{FT}$ |
| LDPEg | 0.5 |

$^{FT}$indicates film tear.

Once again, this example demonstrates that branched low density graft copolymer (LDPEg) is not as good as linear low density graft copolymer (LLDPEg), when blended with low density polyethylene.

EXAMPLE 6

The same components used in Example 5 were used except the blending ratios where changed to 20% weight of the graft copolymers and the heat-sealing was carried out at 430° F. for 1 sec to ethylene-vinyl alcohol copolymer (EVOH) film. The results in lbs/in are given below:

| Graft Copolymer Type in Blend | Adhesion to EVOH |
|---|---|
| LDPEg | 0.2 |
| LLDPEg | 0.8 |

This example shows the superiority of LLDPEg over LDPEg in adhesion to EVOH.

EXAMPLE 7

The same procedure as in Example 4 was used. The main component used was an ethylene-vinyl acetate copolymer (EVA) of melt index 12 g/10 min. and 12% vinyl acetate. The graft copolymers used were the same as those used in Example 4. The blends were prepared and adhesions to nylon 6 and EVOH were determined using the procedures listed in earlier examples. The results of this comparative study were as follows. adhesions given are in lbs/in.

| Graft Copolymer Type | % Graft Copolymer | Adhesion to Nylon | Adhesion to EVOH |
|---|---|---|---|
| LDPEg | 10 | 1.9 | 1.7 |
| | 20 | 1.1 | 1.7 |
| LLDPEg | 10 | >3.4$^{FT}$ | 3.5 |
| | 20 | >3.2$^{FT}$ | 4.1 |

$^{FT}$indicates film tear.

This again illustrates the superiority of the use of graft copolymer made from linear low density polyethylene (LLDPEg) over that made from low density polyethylene (LDPEg).

EXAMPLE 8

The same procedure used in Example 4 was used. However, in this case, the graft coplymer based on linear low density polyethylene (LLDPEg) and that based on low density polyethylene (LDPEg) used in Example 4 were separately blended with a high density polyethylene of high load melt index 14 g/10 min. and a density of 0.944 g/cc. The results of adhesion to nylon are given below in lbs/in. The heat-sealer was set at 430° F. and 1 sec for sealing these films.

| Graft Component Type | % Graft Copolymer in Blend | Adhesion to Nylon |
|---|---|---|
| LLDPEg | 20 | 1.9 |
| LDPEg | 20 | 0.7 |

These results show the superiority of the LLDPEg component over the LDPEg component when used for blending with high density polyethylene.

EXAMPLE 9

A 12% vinyl acetate ethylene-vinyl acetate copolymer (EVA) with a melt index of 12 g/10 min. was blended separately with the high density-based graft copolymer (HDPEg) and the linear low density-based graft copolymer (LLDPEg) used in Example 3, in the ratio 90:10. These blends were then tested for adhesion to aluminum at 1 sec at various temperatures. The results of the adhesion tests were given below in lbs/in:

| Graft Copolymer Type | Adhesion at Temperatures (°F.) | | | | | |
|---|---|---|---|---|---|---|
| | 250 | 260 | 270 | 280 | 290 | 300 |
| LLDPEg | 1.1 | 2.3 | >4.7$^E$ | >5.4$^E$ | >5.4$^E$ | >5.4$^E$ |

-continued

| Graft | Adhesion at Temperatures (°F.) | | | | | |
|---|---|---|---|---|---|---|
| Copolymer Type | 250 | 260 | 270 | 280 | 290 | 300 |
| HDPEg | — | — | 0.2 | 0.6 | 0.8 | 1.0 |

$E$ indicates film elongation.

This example shows the lower temperature of adhesion due to the LLDPEg over that for the HDPEg.

EXAMPLE 10

An ethylene-ethyl acrylate copolymer (EEA) with a melt index of 6.0 g/10 min. and a density of 0.931 g/cc was blended separately with the high density-based graft copolymer (HDPEg) and the linear low density-based graft copolymer (LLDPEg) used in Example 3 in the ratio 90:10 respectively. These blends were then tested for adhesion to aluminum at 1 sec at various temperatures. The results of the adhesion tests are given below in lbs/in.

| Graft Copolymer | Adhesion at Temperatures (°F.) | | | | |
|---|---|---|---|---|---|
| Type in Blend | 250 | 270 | 280 | 290 | 300 |
| LLDPEg | 0.4 | 0.6 | 0.6 | 0.8 | 1.6 |
| HDPEg | 0.1 | 0.2 | 0.2 | 0.2 | 0.2 |

This example shows that when the base resin is ethylene-ethyl acrylate copolymer, the LLDPEg lowers the temperature required for adhesion compared to HDPEg.

EXAMPLE 11

The blends prepared as in Example 9 were tested to copper foil for 1 sec at various temperatures. The results are given below in lbs/in.

| Graft Copolymer | Adhesion to Copper at Temperatures (°F.) | | | | | |
|---|---|---|---|---|---|---|
| Type in Blend | 250 | 260 | 270 | 280 | 290 | 300 |
| HDPEg | 0.2 | 0.2 | 0.3 | 0.4 | 0.4 | 0.6 |
| LLDPEg | 0.5 | 0.8 | 1.0 | 1.3 | 2.1 | >3.2$^E$ |

$E$ indicates elongation of film.

This illustrates the superior low temperature adhesion of the LLDPEg blend to copper over the HDPEg blend.

EXAMPLE 12

The blends prepared as in Example 10 were tested to cooper foil for 1 sec at various temperatures. The results are given below in lbs/in.

| Graft Copolymer | Adhesion to Copper at Temperatures (°F.) | | | | | |
|---|---|---|---|---|---|---|
| Type in Blend | 250 | 260 | 270 | 280 | 290 | 300 |
| LLDPEg | 0.4 | 0.6 | 0.7 | 0.9 | 0.9 | 1.3 |
| HDPEg | 0.1 | 0.1 | 0.2 | 0.2 | 0.3 | |

This illustrates the superior low temperature adhesion of the LLDPEg blend to copper over the HDPEg blend.

EXAMPLE 13

Ethylene-ethyl acrylate copolymer (EEA) used in Example 10 was blended separately with linear low density polyethylene graft copolymer (LLDPEg) used in Example 3 and low density polyethylene graft copolymer (LDPEg) used in Example 4 at a ratio of 90% EEA to 10% graft copolymer. These blends were heat-sealed to nylon 6 at 430° F. and 1 sec. The adhesion data of these tests are given below in lbs/in.

| Graft Copolymer Type in Blend | Adhesion to Nylon |
|---|---|
| LLDPEg | 2.0 |
| LDPEg | 0.4 |

This shows the superior adhesion of the LLDPEg blend over LDPEg blends.

EXAMPLE 14

An 80:20 blend of high density polyethylene of high load melt index 14 g/10 min. and density 0.944 g/cc with linear low density polyethylene graft copolymer used in Example 2 gave a very strong bond with paper when adhered using a heat-sealer set at 430° F. and 1 sec, fiber tear of the paper was obtained.

EXAMPLE 15

An ethylene-vinyl acetate copolymer of melt index 30 g/10 min. and 18% vinyl acetate was blended separately with the HDPEg and LLDPEg copolymers used in Example 2 at a 90:10 blend ratio respectively. The blends were tested for adhesion to aluminum by heat-sealing for 5 sec as a function of temperature. The results are shown below in lbs/in.

| Graft Copolymer | Adhesion to Aluminum at Temperatures (°F.) | | | | |
|---|---|---|---|---|---|
| Type in Blend | 250 | 270 | 280 | 290 | 300 |
| LLDPEg | 1.9 | 2.3 | 2.4 | 2.5 | 2.5 |
| HDPEg | 0.7 | — | 1.1 | — | 1.1 |

This illustrates the lower temperature onset of adhesion for the LLDPEg blend over that for the HDPEg blend.

EXAMPLE 16

Ethylene-methyl acrylate copolymer (EMA), whose melt index is 2.0 g/10 min., and whose density is 0.942 g/cc was blended with linear low density graft copolymer (LLDPEg) used in Example 3. The blend was pressed into films and heat-sealed to polyester film with the heat-sealer set at 600° F. for 1 sec. The results of the adhesion data are given below in lbs/in.

| Graft Copolymer | % Graft Copolymer in Blend | Adhesion to Polyester |
|---|---|---|
| LLDPEg | 10 | 1.7 |

EXAMPLE 17

A blend of 10% linear low density polyethylene graft copolymer (LLDPEg) used in Example 2 with 90% of a linear low density polyethylene (LLDPE) whose melt index was 1.1 g/10 min. and whose density was 0.919 g/cc was prepared by the technique described earlier. This blend was tested for adhesion to a nylon 6 film with the heat-sealer set at 430° F. and 1 sec. The adhesion obtained was an inseparable bond with a strength greater than 7.9 lbs/in.

EXAMPLE 18

The blend of 90% ethylene-methyl acrylate copolymer (EMA) and 10% linear low density polyethylene graft copolymer used in Example 16 gave an adhesion of 1.3 lbs/in to a ethylene-vinyl alcohol copolymer film when heat-sealed at 430° F. for 1 sec.

EXAMPLE 19

A blend of 90% linear low density polyethylene of melt index 2.0 g/10 min. and whose density was 0.920 with 10% linear low density polyethylene graft copolymer described in Example 3 gave an inseparable bond to a poly(acrylonitrile-co-butadiene) film, when heat-sealed at 350° F. and for 1 sec.

EXAMPLE 20

An ethylene-vinyl acetate copolymer whose melt index is 3.0 g/10 min. and whose vinyl acetate content is 9% was blended in a 90:10 ratio with the high density polyethylene graft copolymer and with the linear low density polyethylene graft copolymer both used in Example 2. These blends were then tested for adhesion to aluminum for 5 sec. as a function of temperature. The results are given below in lbs/in.

| Graft Copolymer Type in Blend | Adhesion to Aluminum at Temperatures (°F.) | | | | |
|---|---|---|---|---|---|
| | 250 | 260 | 270 | 280 | 290 |
| LLDPEg | — | 2.1 | 4.4 | 5.9$^E$ | CNS |
| HDPEg | 0.7 | — | 1.4 | 2.8 | 7.1$^E$ |

$^E$indicates elongation of film,
CNS indicates Could Not Separate.

Once again, in a different ethylene-vinyl acetate copolymer base resin, the LLDPEg blend shows better adhesion at low temperatures compared to the HDPEg blend.

EXAMPLE 21

Two blends containing 80% and 90% of a linear low density of melt index 2.0 g/10 min. and a density of 0.919 g/cc and 20% and 10% respectively of a linear low density polyethylene graft copolymer containing 1.1% grafted XMNA monomer and with a density of 0.921 g/cc were prepared as described earlier. Both these blends gave inseparable adhesion to a high density polyethylene, a linear low density polyethylene and a low density polyethylene when heat-sealed at 430° F. for 1 sec.

EXAMPLE 22

Two blends were prepared using the same linear low density polyethylene used in Example 21 as the base resin. The linear low density polyethylene graft copolymer (LLDPEg) used in Example 21, was blended in one of the blends in a 90:10 ratio. In the other blend the low density polyethylene graft copolymer (LDPEg) used in Example 4 was used for blending in at a 90:10 ratio. These blends were heat-sealed to an ethylene-vinyl alcohol copolymer film (EVOH) at 430° F. and 5 sec. The results of the adhesion are shown below in lbs/in.

| Graft Copolymer Type in Blend | % Graft Copolymer | Adhesion to EVOH |
|---|---|---|
| LLDPEg | 10 | 2.9 |
| LDPEg | 10 | 1.3 |

Once again, this demonstrates the superiority of the linear low density graft copolymer over the branched LDPE copolymer even when the density of the two graft copolymers are the same.

EXAMPLE 23

The ethylene-vinyl acetate copolymer described in Example 20 was blended separately with the HDPEg copolymer and with the LLDPEg copolymer, both described in Example 1 at a blend ratio of 90:10. The blending was carried out in a large Banbury-type melt homogenizer. The blends were then blown into film at two different melt temperatures shown in the table below. The extruder used for blowing films is a 1½" Sterling extruder. The films were then tested for clarity as per ANSI/ASTM Standard D-1746-70. The results are reported as percent narrow angle scattering transmittance (NAST). The higher this number, the clearer the film.

| Graft Copolymer Type in Blend | NAST Values at Melt Temperatures of | |
|---|---|---|
| | 400° F. | 435° F. |
| LLDPEg | 26 | 30 |
| HDPEg | 19 | 24 |

This show the superior clarity of the LLDPEg blend over the HDPEg blend.

EXAMPLE 24

The blend used in Example 9 containing 10% LLDPEg used in Example 3 was coextruded separately with nylon-6 and with ethylene-vinyl alcohol copolymer (EVOH). The coextruded cast films obtained had the following total thickness and adhesion values when tested.

| Coextruded with | Total Thickness (mil) | Adhesion (lb/in) |
|---|---|---|
| Nylon-6 | 3.2 | 2.4 |
| EVOH | 3.5 | 1.0 |

EXAMPLE 25

The blend of 90% ehtylene-methyl acrylate copolymer (EMA) and 10% linear low density polyethylene graft copolymer used in Example 16 gave an adhesion of 3.8 lbs/in to a polypropylene film using a heat sealer set at 500° F. and 5 sec.

EXAMPLE 26

The blend of 90% ethylene-vinyl acetate copolymer and 10% linear low density polyethylene graft copolymer used in Example 9 gave an adhesion to a polypropylene film of 1.6 lbs/in using a heat sealer set at 500° F. and 5 sec.

GLOSSARY OF TERMS

EVOH—ethylene-vinyl alcohol copolymers
PVOH—polyvinyl alcohol polymers

LLDPE—linear low density polyethylene having a density of about 0.91–0.939 and a substantial absence of long-chain branching and a high degree of short-chain branching
LLDPEg—graft copolymer with an LLDPE backbone
LDPE—low density polyethylene
XMNA—X-methyl bicyclo(2.2.1)hept-5-ene-2,3-dicarboxylic acid anhydride
HDPE—high density polyethylene
HDPEg—HDPE graft copolymer
CNS—could not separate
LDPEg—LDPE graft copolymer
E—elongation
FT—film tear
PVA—polyvinyl alcohol
EVA—ethylene-vinyl acetate copolymer
EMA—ethylene-methyl acrylate copolymer
SE—slight elongation

We claim:

1. An adhesive blend comprising:
    (a) about 0.1–95 parts by weight in said blend of a graft copolymer of about 70–99.95 wt. % of an LLDPE backbone grafted with about 30–0.05 wt. % of at least one grafting monomer comprising at least one polymerizable ethylenically unsaturated carboxylic acid or carboxylic acid anhydride or about 50–99.90 wt. % of LLDPE backbone co-grafted with about 0.05–25 wt. % of said grafting monomer and about 0.05–25 wt. % of an unsaturated ester, said LLDPE backbone having a density of about 0.91–0.939 g/cc, for a total of 100% and
    (b) about 99.9–5 parts by weight of a blending resin selected from the group consisting of homopolymers of ethylene, α-olefin copolymers of ethylene, copolymers of ethylene and ethylenically unsaturated esters or their derivatives, and blends thereof.

2. The blend of claim 1 wherein said unsaturated ester of (a) includes dialkyl maleates, dialkyl fumarates, dialkyl itaconates, dialkyl mesaconates, dialkyl citraconates, alkyl acrylates, alkyl crotonates, alkyl tiglates and alkyl methacrylates where alkyl represents aliphatic, aryl-aliphatic and cycloaliphatic groups containing 1–12 carbon atoms.

3. The blend of claim 1 wherein said grafting monomer comprises at least one of acrylic acid, methacrylic acid, maleic acid, itaconic acid, citraconic acid, mesaconic acid, maleic anhydride, 4-methyl cyclohex-4-ene-1,2-dicarboxylic acid anhydride, bicyclo(2.2.2)oct-5-ene-2,3-dicarboxylic acid anhydride, 1,2,3,4,5,8,9,10-octahydronaphthalene-2,3-dicarboxylic acid anhydride, 2-oxa-1,3-diketospiro(4.4)non-7-ene, bicyclo(2.2.1)hept-5-ene-2,3-dicarboxylic acid anhydride, maleopimaric acid, tetrahydrophthalic anhydride, methyl Nafdic anhydride, Himic anhydride, methyl Himic anhydride, x-methyl bicyclo(2.2.1)hept-5-ene-2,3-dicarboxylic acid anhydride and fumaric acid.

4. An adhesive blend comprising:
    (a) about 0.9–95 parts by weight in said blend of a graft copolymer of about 70–99.95 wt. % of an LLDPE backbone grafted with about 30–0.05 wt. % of at least one grafting monomer comprising at least one polymerizable ethylenically unsaturated carboxylic acid or carboxylic acid anhydride or about 50–99.90 wt. % of LLDPE backbone co-grafted with about 0.05–25 wt. % of said grafting monomer and about 0.05–25 wt. % of an unsaturated ester, said LLDPE backbone having a density of about 0.91–0.939 g/cc, for a total of 100% and
    (b) about 99.9–5 parts by weight of a blending resin consisting of copolymers of ethylene and ethylenically unsaturated esters or their derivatives.

5. The blend of claim 4 wherein said blending resin comprises ethylene vinyl acetate copolymers, ethylene-methyl acrylate copolymers, or ethylene-ethyl acrylate copolymers.

* * * * *

UNITED STATES PATENT AND TRADEMARK OFFICE
CERTIFICATE OF CORRECTION

PATENT NO. : 4,452,942
DATED : June 5, 1984
INVENTOR(S) : Mitsuzo Shida et al

It is certified that error appears in the above-identified patent and that said Letters Patent is hereby corrected as shown below:

Claim 3 at column 14, line 16, delete "Nafdic" and insert --Nadic-- in lieu thereof; and Claim 4 at column 14, line 20, delete "0.9-95" and insert --0.1-95-- in lieu thereof.

Signed and Sealed this

First Day of April 1986

[SEAL]

Attest:

Attesting Officer

DONALD J. QUIGG

Commissioner of Patents and Trademarks